United States Patent [19]
Okazaki

[11] Patent Number: 6,125,132
[45] Date of Patent: Sep. 26, 2000

[54] LASER DIODE PUMPED SOLID STATE LASER, FIBER LASER AND FIBER AMPLIFIER

[75] Inventor: Yoji Okazaki, Kanagawa-ken, Japan

[73] Assignee: Fuji Photo Film Co., Ltd., Kanagawa-ken, Japan

[21] Appl. No.: 09/066,910

[22] Filed: Apr. 28, 1998

[30] Foreign Application Priority Data

Apr. 28, 1997 [JP] Japan ................................. 9-110554
Jan. 16, 1998 [JP] Japan ................................. 10-006369
Jan. 16, 1998 [JP] Japan ................................. 10-006370

[51] Int. Cl.$^7$ ................................................. H01S 3/091
[52] U.S. Cl. .................................................. 372/75; 372/6
[58] Field of Search ......................... 372/75, 70, 6, 372/92, 69

[56] References Cited

U.S. PATENT DOCUMENTS

| | | | |
|---|---|---|---|
| 3,524,549 | 8/1970 | Geusic et al. | 372/69 |
| 5,309,452 | 5/1994 | Ohishi et al. | 372/6 |
| 5,499,256 | 3/1996 | Bischel et al. | 372/92 |
| 5,727,007 | 3/1998 | Smart et al. | 372/6 |
| 6,009,114 | 12/1999 | Heller et al. | 372/75 |

OTHER PUBLICATIONS

"Journal of Applied Physics" vol. 48, No. 2, pp. 650 to 653, Feb. 1977.

*Primary Examiner*—Leon Scott, Jr.
*Attorney, Agent, or Firm*—Sughrue, Mion, Zinn, Macpeak & Seas, PLLC

[57] ABSTRACT

A solid laser crystal added with $Pr^{3+}$ is pumped by a InGaN laser diode to generated a laser beam. A fiber having a core added with $Pr^{3+}$ is pumped by a GaN laser diode to generated a laser beam. A fiber having a core added with $Pr_{3+}$ is pumped by a GaN laser diode to generate fluorescence and incident light in the wavelength range of the fluorescence is amplified by energy of the fluorescence.

14 Claims, 3 Drawing Sheets

LASER DIODE PUMPED SOLID STATE LASER, FIBER LASER AND FIBER AMPLIFIER

BACKGROUND OF THE INVENTION

1. Field of the Invention

This invention relates to a laser diode pumped solid state laser in which a solid laser crystal added with $Pr^{3+}$ is pumped by a laser diode (semiconductor laser), a fiber laser in which a fiber having a core added with $Pr^{3+}$ is pumped by a laser diode, and a fiber amplifier in which a fiber having a core added with $Pr^{3+}$ is pumped by a laser diode to generate fluorescence and light entering the fiber is amplified by the fluorescence.

2. Description of the Related Art

As disclosed, for instance, in "Journal of Applied Physics" Vol. 48, No. 2, pp, 650 to 653 (1977), and "Applied Physics B58", pp. 149 to 151 (1994), there has been known a gas laser pumped solid state laser in which a solid laser crystal added with $Pr^{3+}$ is pumped by a gas laser such as an Ar laser.

In such a gas laser pumped solid state laser, a laser beam in a blue spectral range having a wavelength of 470 to 490 nm can be generated by $^3P_0 \rightarrow ^3H_4$ transition and a laser beam in a green spectral range having a wavelength of 520 to 550 nm can be generated by $^3P_1 \rightarrow ^3H_5$ transition. Accordingly such a gas laser pumped solid state laser can be employed as a light source for recording a color image on a color photosensitive material.

As solid state lasers generating laser beams in the blue spectral range or the green spectral range, there have been known laser diode pumped solid state lasers in which a solid laser beam is converted to its second harmonic by a nonlinear optical crystal disposed in a resonator as disclosed, for instance, in Japanese Unexamined Patent Publication No. 4(1992)-318988.

Further there have been recently developed InGaN laser diodes and ZnMgSSe laser diodes which generate laser beams in the blue spectral range or the green spectral range.

When a laser generating a laser beam in the blue or green spectral range is employed as a light source for recording a color image, it is desired that the laser is small in both size and weight and is inexpensive. From this viewpoint, the aforesaid gas laser pumped solid state laser in which a solid laser crystal added with $Pr^{3+}$ is pumped by a gas laser is disadvantageous since the gas laser is large in both size and weight and expensive.

Further the aforesaid laser diode pumped solid state laser in which a solid laser beam is converted to a laser beam having a shorter wavelength by a nonlinear optical crystal has a problem that it is difficult to operate at a high output power since the wavelength conversion efficiency is not sufficient at present. Further in the laser diode pumped solid state laser, an etalon or the like is disposed in the resonator in order to make the oscillation mode a single longitudinal mode, the resonator loss is increased, which also makes the solid state laser difficult to operate at a high output power.

Further the solid state laser requires a high accuracy temperature control in order to obtain phase matching in wavelength conversion, which deteriorates stability of output power. Further the nonlinear optical crystal and the etalon add to the number of parts of the solid state laser, which increases the manufacturing cost of the solid state laser.

In the InGaN laser diodes, since the oscillating wavelength becomes longer as the In content increases, it is theoretically possible to generate a laser beam in a blue spectral range having a wavelength of 470 to 490 nm or a laser beam in a green spectral range having a wavelength of 520 to 550 nm. However since crystallizability deteriorates as the In content increases, increase in the In content is practically limited and the wavelength of the laser beam generated by the InGaN laser diode can be increased up to about 450 nm at most.

Laser diodes having an active layer of InGaNAs or GaNAs can also generate a laser beam in the blue spectral range. In these laser diodes, the oscillating wavelength can be increased by doping As. However since crystallizability deteriorates as the As content increases, the wavelength of the laser beam generated by the laser diode at a practical output power can be increased up to about 450 nm to 460 nm at most.

Further the aforesaid ZnMgSSe laser diodes are disadvantageous in that they cannot continuously oscillate at room temperature at a wavelength shorter than 500 nm and their service life is about 100 hours at most.

Further there has been known a fiber laser in which a fiber having a fluoride core added with $Pr^{3+}$ is pumped by a laser diode as disclosed in "Electronic Communication Society Technical Information": LQE95-30(1995) p.30 and "Optics communications" 86(1991) p.337.

Further there has been known a fiber amplifier in which a fiber having a core added with $Pr^{3+}$ is pumped by a laser diode to generate fluorescence and light in the wavelength range of the fluorescence is amplified by energy of the fluorescence as disclosed also in the above papers.

Especially in the latter paper, there is described a $Pr^{3+}$-doped fiber laser pumped by an Ar laser which oscillates at 491 nm, 520 nm, 605 nm and 635 nm when pumped by a 476.5 nm laser beam.

Since these fiber laser and fiber amplifier can generate or amplify a laser beam in the blue or green spectral range, it is possible to form a light source for recording a color image on a color photosensitive material by use of the fiber laser and/or the fiber amplifier.

However the aforesaid fiber laser and the fiber amplifier pumped by an Ar laser requires a water cooling means when pumped by power of several watts to several tens of watts in order to record a color image, which increases the overall size of the system, shortens the service life and deteriorates the efficiency.

SUMMARY OF THE INVENTION

In view of the foregoing observations and description, the primary object of the present invention is to provide a laser diode pumped solid state laser which can efficiently generate a high power laser beam in the blue or green spectral range, is high in output stability and can be manufactured at low cost.

Another object of the present invention is to provide a fiber laser which can efficiently generate a high power laser beam in the blue or green spectral range, is high in output stability and beam quality and can be small in size.

Still another object of the present invention is to provide a fiber amplifier which can efficiently amplify a laser beam in the blue or green spectral range, is high in output stability and beam quality and can be small in size.

In accordance with a first aspect of the present invention, there is provided a laser diode pumped solid state laser in which a solid laser crystal added with $Pr^{3+}$ is pumped by a laser diode selected from the group consisting of InGaN laser diodes (laser diodes having an active layer of an InGaN material), InGaNAs laser diodes (laser diodes having an active layer of an InGaNAs material), and GaNAs laser diodes (laser diodes having an active layer of a GaNAs material).

The laser diode pumped solid state laser of the present invention can generate a laser beam in a blue spectral range having a wavelength of 465 to 495 nm by $^3P_0 \rightarrow {}^3H_4$ transition and a laser beam in a green spectral range having a wavelength of 515 to 555 nm by $^3P_1 \rightarrow {}^3H_5$ transition.

Further the laser diode pumped solid state laser of the present invention can generate a laser beam in a red spectral range having a wavelength of 600 to 660 nm by $^3P_0 \rightarrow {}^3F_2$ transition or $^3P_0 \rightarrow {}^3H_6$ transition.

The solid laser crystal added with $Pr^{3+}$ can be pumped, for instance, by a pumping light of 440 nm. Since the InGaN laser diodes are free from the problem of deterioration in crystallizability at an oscillating wavelength not higher than 450 nm as described above. Accordingly, the InGaN laser diodes are suitable for obtaining a pumping light of 440 nm.

Further since being very large in thermal conductivity, 130 W/m°C., as compared with that of the ZnMgSSe laser diodes, 4 W/m°C. and at the same time very small in mobility of the transition as compared with that of the ZnMgSSe laser diodes, the InGaN laser diodes is less apt to get COD (catastrophic optical damage) and is apt to get long service life and high output. By using such an InGaN laser diode as the pumping light source, the laser diode pumped solid state laser of the present invention can be long in service life and can generate a high output laser beam in the blue or green spectral range.

The InGaN laser diode may be of a single longitudinal mode type, a single transverse mode type, a broad area type, a phased array type, a high output MOPA type or the like. One or more these InGaN laser diodes may be used. By use of a plurality of InGaN laser diodes, the output of the laser diode pumped solid state laser of the present invention can be increased up to several watts.

The InGaNAs laser diodes and the GaNAs laser diodes have features similar to those of the InGaN laser diodes described above.

Further since the laser diode pumped solid state laser of the present invention requires neither a nonlinear optical crystal nor an etalon or the like, it is free from loss due to these elements and can efficiently generate a laser beam in the blue or green spectral range. Specifically the laser diode pumped solid state laser of the present invention can be not less than 50% in slope efficiency. Further since requiring neither a nonlinear optical crystal nor an etalon or the like, the laser diode pumped solid state laser of the present invention can be small in number of the optical elements, simple in structure and wide in the temperature range over which it can operate stably. Thus the laser diode pumped solid state laser of the present invention can be a light source which is inexpensive and excellent in stability.

Further in the laser diode pumped solid state laser of the present invention, wavelength conversion is not effected and high accuracy temperature control for phase matching is not necessary. Accordingly deterioration in output stability due to the temperature control can be avoided.

In accordance with a second aspect of the present invention, there is provided a laser fiber in which a fiber having a core added with $Pr^{3+}$ is pumped by a GaN laser diode.

The laser fiber of the present invention can generate a laser beam in a blue spectral range having a wavelength of 465 to 495 nm by $^3P_0 \rightarrow {}^3H_4$ transition and a laser beam in a green spectral range having a wavelength of 515 to 555 nm by $^3P_1 \rightarrow {}^3H_5$ transition.

Further the laser fiber of the present invention can generate a laser beam in a red spectral range having a wavelength of 600 to 660 nm by $^3P_0 \rightarrow {}^3F_2$ transition or $^3P_0 \rightarrow {}^3H_6$ transition.

Specifically the GaN laser diode used as the pumping light source of the laser fiber of the present invention may be those having an active layer of InGaN, InGaNAs or GaNAs.

As described above in conjunction with the laser diode pumped solid state laser of the present invention, the solid laser crystal added with $Pr^{3+}$ can be pumped, for instance, by a pumping light of 440 nm. Since the InGaN laser diodes are free from the problem of deterioration in crystallizability at an oscillating wavelength not higher than 450 nm as described above. Accordingly, the InGaN laser diodes are suitable for obtaining a pumping light of 440 nm.

Further since being very large in thermal conductivity, 130 W/m°C., as compared with that of the ZnMgSSe laser diodes, 4 W/m°C. and at the same time very small in mobility of the transition as compared with that of the ZnMgSSe laser diodes, the InGaN laser diodes is less apt to get COD (catastrophic optical damage) and is apt to get long service life and high output. By using such an InGaN laser diode as the pumping light source, the fiber laser of the present invention can be long in service life and can generate a high output laser beam in the blue or green spectral range.

An equivalent result can be obtained even if an InGaNAs laser diode or a GaNAs laser diode is used.

Further the fiber having a core added with $Pr^{3+}$ can be easily not smaller than 0.5 m in length. When such a long fiber is used, heat energy of the pumping light cannot be localized on a part of the fiber and accordingly deterioration in the beam quality and/or output stability due to heat can be avoided, whereby the beam quality and/or output stability can be stabilized.

Further since the laser fiber of the present invention is basically formed by one fiber and one laser diode and requires no water cooling means, the overall size of the system can be small and the system can be long in service life and high in efficiency.

In accordance with a third aspect of the present invention, there is provided a fiber amplifier in which a fiber having a core added with $Pr^{3+}$ is pumped by a GaN laser diode to generate fluorescence and incident light in the wavelength range of the fluorescence is amplified by energy of the fluorescence.

The fiber amplifier of the present invention can generate fluorescence having a wavelength of 465 to 495 nm by $^3P_0 \rightarrow {}^3H_4$ transition to amplify incident light in this wavelength range, and fluorescence having a wavelength of 515 to 555 nm by $^3P_1 \rightarrow {}^3H_5$ transition to amplify incident light in this wavelength range.

Further the fiber amplifier of the present invention can generate fluorescence having a wavelength of 600 to 660 nm by $^3P_0 \rightarrow {}^3F_2$ transition or $^3P_0 \rightarrow {}^3H_6$ transition to amplify incident light in this wavelength range.

Specifically the GaN laser diode used as the pumping light source of the fiber amplifier of the present invention may be those having an active layer of InGaN, InGaNAs or GaNAs.

All the results described above in conjunction with the fiber laser of the present invention can be obtained also in the fiber amplifier of the present invention.

DESCRIPTION OF THE PREFERRED EMBODIMENTS

Figure 1:
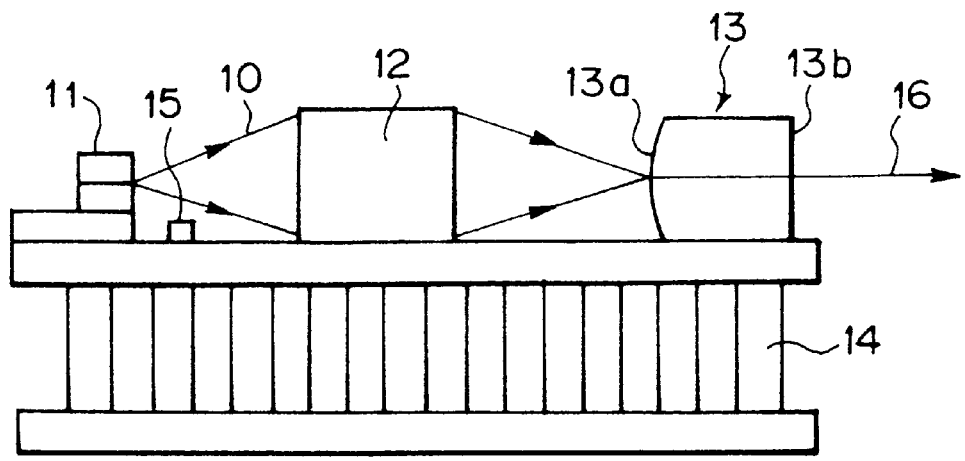
FIG. 1 is a schematic side view of a laser diode pumped solid state laser in accordance with a first embodiment of the present invention.

In FIG. 1, a laser diode pumped solid state laser in accordance with a first embodiment of the present invention comprises a laser diode 11 which produces a laser beam 10 as a pumping beam, a condenser lens 12 which condenses the laser beam 10, which is produced as divergent light, and a $LiYF_4$ crystal 13 which is a solid laser medium doped with $Pr^{3+}$ (will be referred to as "$Pr^{3+}:LiYF_4$ crystal", hereinbelow).

These elements 11 to 13 are fixed to a Peltier element 14. A thermistor 15 is fixed to the Peltier element 14 and the output of the thermistor 15 is input into a temperature control circuit (not shown). The temperature control circuit drives the Peltier element 14 on the basis of the output of the thermistor 15 to keep the laser diode 11, the condenser lens 12 and the $Pr^{3+}:LiYF_4$ crystal 13 at a predetermined temperature.

The laser diode 11 is a broad area type InGaN laser diode whose oscillating wavelength is 444 nm. The rear end face 13a (through which the pumping beam enters the $Pr^{3+}$:$LiYF_4$ crystal) of the $Pr^{3+}:LiYF_4$ crystal 13 is provided with a coating which is highly reflecting (a reflectivity of not lower than 99.9%) to light of 479 nm (to be described later) and the front end face 13b of the $Pr^{3+}:LiYF_4$ crystal 13 is provided with a coating which transmits only 1% of light of 479 nm and reflects the other part of light of 479 nm.

The laser beam 10 of 444 nm generated from the InGaN laser diode 11 enters the $Pr^{3+}:LiYF_4$ crystal 13 through the rear end face 13a thereof and pumps $Pr^{3+}$. When pumped by the laser beam 10, $Pr^{3+}$ emits light of 479 nm by $^3P_0 \rightarrow ^3H_4$ transition. The light of 479 nm resonates between the end faces 13a and 13b and generates laser oscillation. A blue laser beam 16 of 479 nm thus generated emanates through the front end face 13b of the $Pr^{3+}:LiYF_4$ crystal 13.

In this embodiment, a laser beam 16 of 1 mw can be obtained when a laser diode 11 of 300 mW is used.

Figure 2:
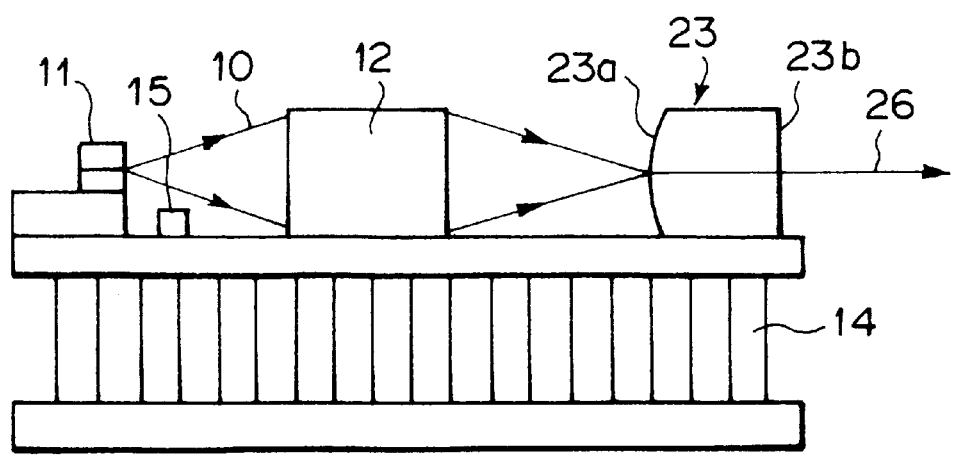
FIG. 2 is a schematic side view of a laser diode pumped solid state laser in accordance with a second embodiment of the present invention.

A laser-diode-pumped solid state laser in accordance with a second embodiment of the present invention will be described with reference to FIG. 2, hereinbelow. In FIG. 2, the elements analogous to those shown in FIG. 1 are given the same reference numerals and will not be described here.

In this embodiment, the rear end face 23a of the $Pr^{3+}$:$LiYF_4$ crystal 23 is provided with a coating which is highly reflecting (a reflectivity of not lower than 99.9%) to light of 532 nm (to be described later) and the front end face 23b of the $Pr^{3+}:LiYF_4$ crystal 23 is provided with a coating which transmits only 1% of light of 532 nm and reflects the other part of light of 532 nm.

The laser beam 10 of 444 nm generated from the InGaN laser diode 11 enters the $Pr^{3+}:LiYF_4$ crystal 23 through the rear end face 23a thereof and pumps $Pr^{3+}$. When pumped by the laser beam 10, $Pr^{3+}$ emits light of 532 nm by $^3P_1 \rightarrow ^3H_5$ transition. The light of 532 nm resonates between the end faces 23a and 23b and generates laser oscillation. A green laser beam 26 of 532 nm thus generated emanates through the front end face 23b of the $Pr^{3+}:LiYF_4$ crystal 23.

In this embodiment, a laser beam 26 of 10 mW can be obtained when a laser diode 11 of 200 mW is used.

Though, in the first and second embodiments described above, a laser diode 11 having an active layer of InGaN is used as a pumping light source, a laser diode having an active layer of InGaNAs or GaNAs may be used as the pumping light source. Especially when the absorption band of the solid laser crystal is on a longer wavelength side, it is preferred that an InGaNAs or GaNAs laser diode be used. The InGaNAs laser diodes and GaNAs laser diodes are more apt to generate a laser beam of a longer wavelength than the InGaN laser diodes and accordingly the absorption efficiency can be improved by use of an InGaNAs or GaNAs laser diode.

Figure 3:
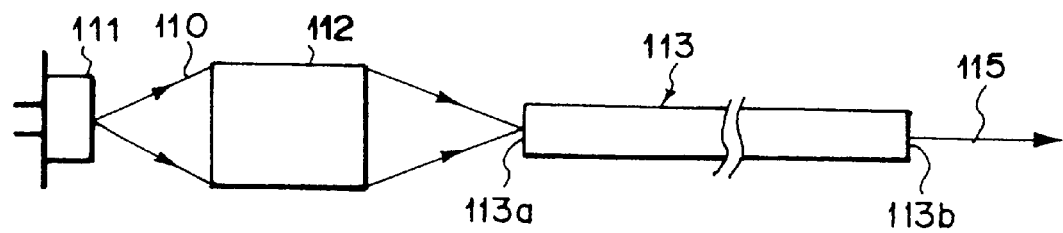
FIG. 3 is a schematic side view of a fiber laser in accordance with a third embodiment of the present invention.

A fiber laser in accordance with a third embodiment of the present invention will be described with reference to FIGS. 3 and 4, hereinbelow. In FIG. 3, a laser fiber in accordance with a third embodiment of the present invention comprises a laser diode 111 which produces a laser beam 110 as a pumping beam, a condenser lens 112 which condenses the laser beam 110, which is produced as divergent light, and a fiber 113 having a core doped with $Pr^{3+}$.

The laser diode 111 is a broad area type InGaN laser diode whose oscillating wavelength is 444 nm.

Figure 4:
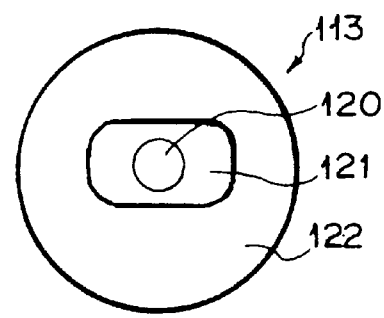
FIG. 4 is a cross-sectional view of the fiber employed in the fiber laser.

As shown in FIG. 4, the fiber 113 comprises a core 120 which is circular in cross-section, a first clad 121 which is disposed around the core 120 and is substantially rectangular in cross-section and a second clad 122 which is disposed around the first clad 121 and is circular in cross-section. The core 120 is of fluoride glass doped with $Pr^{3+}$ and may be, for instance, of ZBLANP ($ZrF_4$—$BaF_2$—$LaF_3$—$AlF_3$—$AlF_3$—$NaF$—$PbF_2$). The first clad 121 may be of, for instance, ZBLAN ($ZrF_4$—$BaF_2$—$LaF_3$—$AlF_3$—$NaF$) and the second clad 122 may be of, for instance, polymer.

The core 120 need not be limited to the ZBLANP but may be of ZBLAN, In/Ga fluoride glass, e.g., IGPZCL (($InF_3$—$GaF_3$—$LaF_3$)—($PbF_2$—$ZnF_2$)—CdF), or the like.

The laser beam 110 of 444 nm condensed by the condenser lens 112 is input into the first clad 121 and propagates through the first clad 121 in a waveguide mode. That is, the first clad 121 functions as a core for the pumping laser beam 110.

The laser beam 110 also travels through the core 120 during propagation through the first clad 121. In the core 120, the $Pr^{3+}$ is pumped by the laser beam 110 and emits fluorescence of 491 nm by $^3P_0 \rightarrow ^3H_4$ transition. The fluorescence propagates through the core 120 in a waveguide mode.

In the core 120 of ZBLANP, fluorescence of 520 nm can be emitted by $^3P_1 \rightarrow ^3H_5$ transition, fluorescence of 605 nm can be emitted by $^3P_0 \rightarrow {}^3F_2$ transition, and fluorescence of 635 nm can be emitted by $^3P_0 \rightarrow {}^3F_3$ transition.

In this embodiment, the rear end face 113a of the fiber 113 is provided with a coating which is highly reflecting to a wavelength of 491 nm and anti-reflective to wavelengths of 520 nm, 605 nm, 635 nm and 444 nm (the wavelength of the pumping laser beam) and the front end face 113b of the fiber 113 is provided with a coating which transmits only 1% of light of 491 nm and reflects the other part of light of 491 nm.

The fluorescence of 491 nm resonates between the end faces 113a and 113b and generates laser oscillation. A blue-green laser beam 115 of 491 nm thus generated emanates through the front end face 113b of the fiber 113.

In this embodiment, the laser beam 115 propagates through the core 120 in a single mode and the pumping laser beam 110 propagates through the first clad 121 in a multiple mode. With this arrangement, a broad area type laser diode 111 which is high in output power is employed as the pumping light source and the pumping laser beam 110 can be input into the fiber 113 at a high efficiency.

In addition, since the first clad 121 is substantially rectangular in cross-section, the laser beam 110 is irregularly reflected in the first clad 121 and the probability that the laser beam 110 enters the core 120 is increased.

Thus a high oscillation efficiency is ensured and a high output power laser beam 115 can be obtained. In this embodiment, a laser beam 115 of 100 mW can be obtained when a fiber 113 0.5 m long and a laser diode 111 of 1 W are used.

Figure 5:
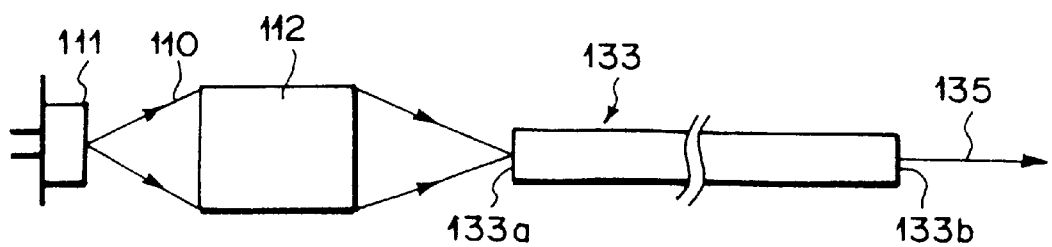
FIG. 5 is a schematic side view of a fiber laser in accordance with a fourth embodiment of the present invention.

A fiber laser in accordance with a fourth embodiment of the present invention will be described with reference to FIG. 5, hereinbelow. The fiber laser of this embodiment basically differs from that of the third embodiment in the coatings on the end faces of the fiber.

That is, in this embodiment, the rear end face 133a of the fiber 133 is provided with a coating which is highly reflecting to a wavelength of 520 nm and anti-reflective to wavelengths of 491 nm, 605 nm, 635 nm and 444 nm (the wavelength of the pumping laser beam) and the front end face 133b of the fiber 133 is provided with a coating which transmits only 2% of light of 520 nm and reflects the other part of light of 520 nm.

The fluorescence of 520 nm resonates between the end faces 133a and 133b and generates laser oscillation. A green laser beam 135 of 520 nm thus generated emanates through the front end face 133b of the fiber 133. In this embodiment, a laser beam 135 of 200 mW can be obtained when a fiber 133 1 m long and a laser diode 111 of 1 W are used.

Figure 6:
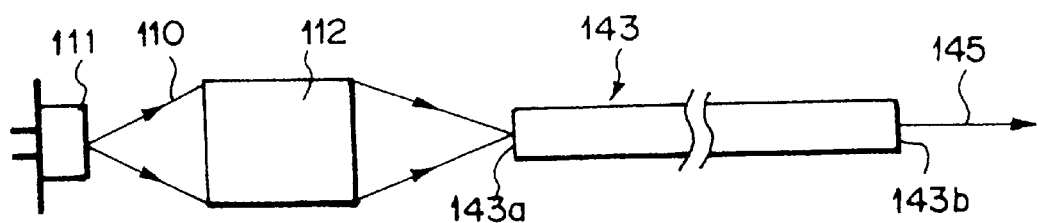
FIG. 6 is a schematic side view of a fiber laser in accordance with a fifth embodiment of the present invention.

A fiber laser in accordance with a fifth embodiment of the present invention will be described with reference to FIG. 6, hereinbelow. The fiber laser of this embodiment basically differs from that of the third embodiment in the coatings on the end faces of the fiber.

That is, in this embodiment, the rear end face 143a of the fiber 143 is provided with a coating which is highly reflecting to a wavelength of 635 nm and anti-reflective to wavelengths of 491 nm, 520 nm, 605 nm and 444 nm (the wavelength of the pumping laser beam) and the front end face 143b of the fiber 143 is provided with a coating which transmits only 3.5% of light of 635 nm and reflects the other part of light of 635 nm.

The fluorescence of 635 nm resonates between the end faces 143a and 143b and generates laser oscillation. A red laser beam 145 of 635 nm thus generated emanates through the front end face 143b of the fiber 143. In this embodiment, a laser beam 145 of 300 mW can be obtained when a fiber 143 1 m long and a laser diode 111 of 1 W are used.

Figure 7:
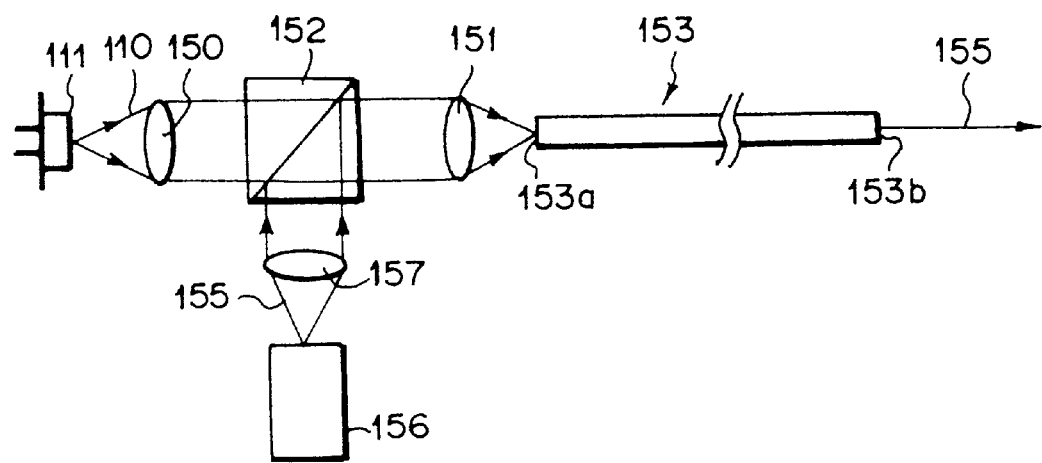
FIG. 7 is a schematic side view of a fiber amplifier in accordance with a sixth embodiment of the present invention.

A fiber amplifier in accordance with a sixth embodiment of the present invention will be described with reference to FIG. 7, hereinbelow. In FIG. 7, the fiber amplifier of this embodiment comprises a laser diode 111 which produces a laser beam 110 as a pumping beam, a collimator lens 150 which collimates the laser beam 110, which is produced as divergent light, a condenser lens 151 which condenses the collimated laser beam 110, and a fiber 153 having a core doped with $Pr^{3+}$.

A beam splitter 152 is disposed between the collimator lens 150 and the condenser lens 151. A SHG (second harmonic generator) laser 156 which generates a laser beam 155 of 520 nm is disposed below the beam splitter 152. The laser beam 155 is collimated by a collimator lens 157 and enters the beam splitter 152.

The fiber 153 is basically the same in structure as that shown in FIG. 4, though the rear and front end faces 153a and 153b are provided with a coating which is anti-reflective to the wavelengths described above in conjunction with the third to sixth embodiments of the present invention.

The SHG laser 156 is for obtaining the laser beam 155 of 520 nm by causing a laser beam of 1040 nm generated from a DBR (distributed Bragg reflection) laser diode as a light source of fundamental wave to enter an optical waveguide formed of a nonlinear optical material having periodic domain reversals.

The laser beam 155 is reflected by the beam slitter 152 to enter the fiber 153 together with the laser beam 110. In the fiber 153, $Pr^{3+}$ is pumped by the laser beam 110 and emits fluorescence of 520 nm. The laser beam 155 receives energy from the fluorescence of the same wavelength and is amplified. Then the amplified laser beam 155 emanated forward from the front end face 153b of the fiber 153.

When the output power of the SHG laser 156 is 10 mW, the output power of the amplified laser beam 155 can be 200 mW in this embodiment.

By adding modulation function to the DBR laser diode which is the light source of fundamental wave of the SHG laser 156, the amplified laser beam 155 can be modulated.

Though, in the third to sixth embodiments described above, a laser diode having an active layer of InGaN is used as a pumping light source, a laser diode having an active layer of InGaNAs or GaNAs may be used as the pumping light source. Especially when the absorption band of the fiber core is on a longer wavelength side, it is preferred that an InGaNAs or GaNAs laser diode be used. The InGaNAs laser diodes and GaNAs laser diodes are more apt to generate a laser beam of a longer wavelength than the InGaN laser diodes and accordingly the absorption efficiency can be improved by use of an InGaNAs or GaNAs laser diode.

What is claimed is:

1. A laser diode pumped solid state laser in which a solid laser crystal added with $Pr^{3+}$ is pumped by a laser diode having an active layer of a material selected from the group consisting of InGaN, InGaNAs and GaNAs.

2. A laser diode pumped solid state laser as defined in claim 1 which generates a laser beam in the spectral range of 465 to 495 nm by $^3P_0 \rightarrow {}^3H_4$ transition.

3. A laser diode pumped solid state laser as defined in claim 1 which generates a laser beam in the spectral range of 515 to 555 nm by $^3P_1 \rightarrow {}^3H_5$ transition.

4. A laser diode pumped solid state laser as defined in claim 1 which generates a laser beam in the spectral range of 600 to 660 nm by $^3P_0 \rightarrow {}^3F_2$ transition or $^3P_0 \rightarrow {}^3H_6$ transition.

5. A laser fiber in which a fiber having a core added with $Pr^{3+}$ is pumped by a GaN laser diode.

6. A laser fiber as defined in claim 5 which generates a laser beam in the spectral range of 465 to 495 nm by $^3P_0 \rightarrow {}^3H_4$ transition.

7. A laser fiber as defined in claim 5 which generates a laser beam in the spectral range of 515 to 555 nm by $^3P_1 \rightarrow {}^3H_5$ transition.

8. A laser fiber as defined in claim 5 which generates a laser beam in the spectral range of 600 to 660 nm by $^3P_0 \rightarrow {}^3F_2$ transition or $^3P_0 \rightarrow {}^3H_6$ transition.

9. A laser fiber as defined in claim 5 in which said GaN laser diode is a laser diode having an active layer of a material selected from the group consisting of InGaN, InGaNAs and GaNAs.

10. A fiber amplifier in which a fiber having a core added with $Pr^{3+}$ is pumped by a GaN laser diode to generate fluorescence and incident light in the wavelength range of the fluorescence is amplified by energy of the fluorescence.

11. A fiber amplifier as defined in claim 10 in which fluorescence in the spectral range of 465 to 495 nm is generated by $^3P_0 \rightarrow {}^3H_4$ transition and incident light in this wavelength range is amplified.

12. A fiber amplifier as defined in claim 10 in which fluorescence in the spectral range of 515 to 555 nm is generated by $^3P_1 \rightarrow {}^3H_5$ transition and incident light in this wavelength range is amplified.

13. A fiber amplifier as defined in claim 10 in which fluorescence in the spectral range of 600 to 660 nm is generated by $^3P_0 \rightarrow {}^3F_2$ transition or $^3P_0 \rightarrow {}^3H_6$ transition and incident light in this wavelength range is amplified.

14. A fiber amplifier as defined in claim 10 in which said GaN laser diode is a laser diode having an active layer of a material selected from the group consisting of InGaN, InGaNAs and GaNAs.

* * * * *